March 1, 1949.  H. C. HALLERSTROM  2,463,378
FRICTION LOCK FOR THREADED FASTENINGS
Filed Dec. 13, 1944
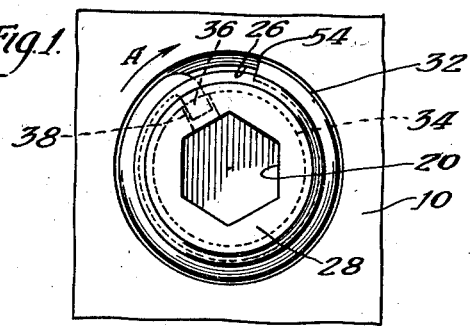
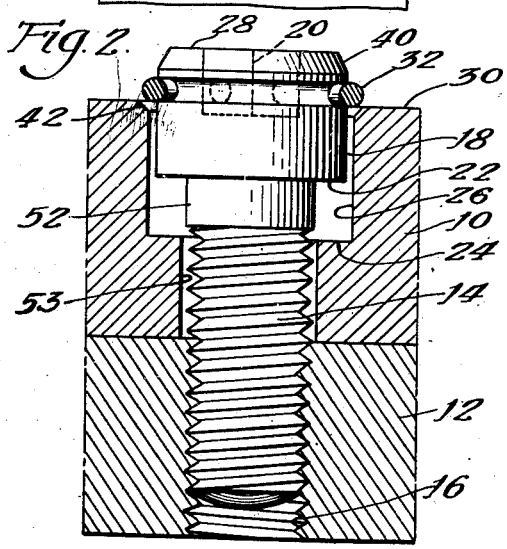
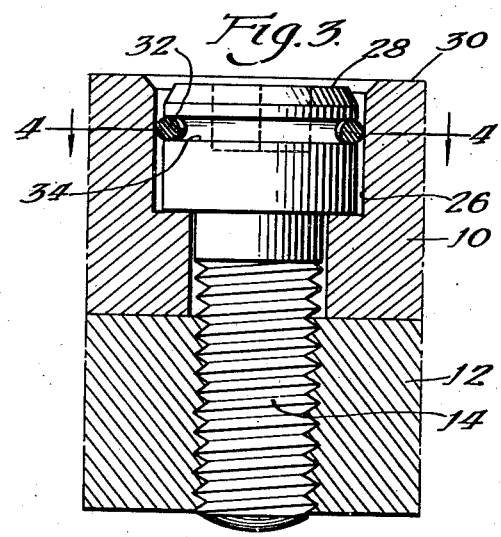
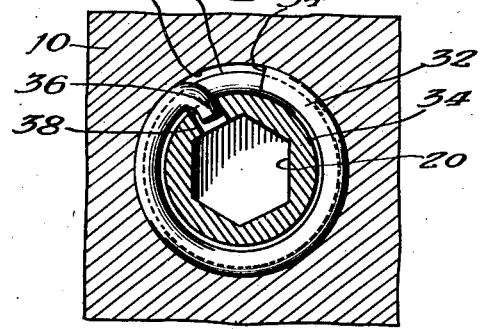
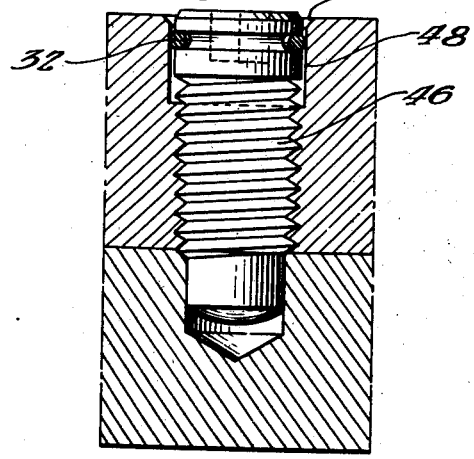
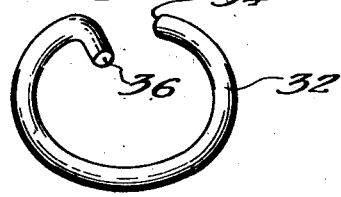
Inventor:
Harold C. Hallerstrom
By: J. P. Keiper
Attorney Patented Mar. 1, 1949

2,463,378

UNITED STATES PATENT OFFICE 2,463,378

FRICTION LOCK FOR THREADED FASTENINGS

Harold C. Hallerstrom, Evanston, Ill., assignor of one-tenth to Francis P. Keiper, Evanston, Ill.

Application December 13, 1944, Serial No. 567,970

1 Claim. (Cl. 151—32)

This invention relates to locking devices for screw-threaded fastenings and more particularly to fastenings for screws of the socket or fillister head type, adapted for countersinking in a cylindrical-walled counterbore.

Standard screw-threaded fastenings of the socket head type, have comparatively small diameter heads, resulting in a small head shoulder, and are commonly of hardened high-strength steel. In common practice such screws are countersunk into the structural member which is secured by them and the diameter of the counter bore to avoid unnecessary weakening of the structural member is only slightly larger than the head diameter. The hardness of the head prevents the use of the common type of toothed lockwasher, since the toothed lock-washer is prevented from digging into the head. Since the structural members are often also hardened, this factor doubly prevents such washers from properly functioning. The limited radial space provided underneath the head shoulder is also such as to eliminate the possibility of employing the common lock-washer, even if such washer could function normally. Further, such washers prevent an even uniform bearing, and reduce the supporting area contact on the head and on the structural member. The absence of a satisfactory locking device for screws of this type has often prevented the use of such screws when locking of the screw is essential.

The object of the present invention is to provide a means for locking such a screw under all common conditions without interfering in any way with the common method of using the standard screw.

Additionally, the object of the invention is to provide a locking means capable of repeated use, and adapted to be made of various materials including those which will withstand heat, corrosive action and the like to the same degree as the material of the screw.

A further object of the invention is in the provision of a locking device which, together with the screw, forms an assembly unit, thereby facilitating application of the device and insuring against the possibility of omitting the locking element.

The above and other novel features of the invention will appear more fully hereinafter from the following detailed description when taken in connection with the accompanying drawing. It is expressly understood, however, that the drawing is employed for purposes of illustration only and is not designed as a definition of the limits of the invention, refernce being had for this purpose to the appended claim.

In the drawing, wherein similar reference characters refer to similar parts throughout the several views:

Figure 1 is a top plan view of a socket-head screw having the locking device assembled thereon, and positioned for insertion into a counterbored structural member.

Figure 2 is a side elevation of the screw assembly of Figure 1, about to be drawn into the structural member shown in section.

Figure 3 is a side elevation of the screw assembly shown seated in the structural members illustrated in section.

Figure 4 is a transverse section taken substantially on the line 4—4 of Figure 3 showing the position of the parts in operative relationship.

Figure 5 is an illustration of the invention applied to a set screw; and

Figure 6 is a perspective view of the friction-locking ring shown in Figures 1–4, incl.

Referring to the drawings and particularly Figures 1 and 2, there will appear structural members 10 and 12 adapted to be secured together by suitable fastening means, comprising one or more socket-head screws such as 14. Such socket-head screws have a threaded shank adapted to be screwed into a threaded aperture 16 of member 12, and a head of generally cylindrical shape 18, having a wrench-receiving socket 20. The offset of the head provides the annular shoulder 22, adapted to engage the seat 24 of the counterbore 26 in the member 10. The axial length of the head of such a screw is governed by the strength requirements of the screw as a fastening means and the depth of the wrench socket 20 necessary to manipulate the screw into position, and the depth of the counterbore is such that the head end surface 28, when the screw is seated, be flush or slightly below the surface 30 of the structural member 10 (see Figure 3).

In order to prevent such a screw from loosening when drawn into securing position as shown in Figure 3, a split spring friction ring 32 is provided, the ring being keyed to rotate with the screw, and being adapted to engage the cylindrical side wall 26 of the counterbore. So that standard head sizes and counterbores may be employed, the head is provided with an annular groove 34 in which the split ring is partially recessed as shown in Figure 1, and into which the ring is resiliently compressed, as shown in Figure 3 when the ring is drawn into the bore 26.

To key the ring against rotation relative to the screw head, one end of the ring is bent radially inward as at 36, and adapted to be received in a radial aperture 38, which can extend from the base of the annular groove 34 into the wrench-receiving socket 20, if desired. In assembling the spring ring upon the screw head, the ring portion extends from the key in the same direction as the direction of rotation of the screw in loosening the screw, and to facilitate springing the ring into place the top edge of the screw may be beveled as at 40. In order to facilitate the contraction of the ring as it is drawn into the counterbore 26, the upper end of the counterbore is bell-mouthed or beveled as at 42 to "cam" the ring to its contracted diameter as shown in Figures 3 and 4.

The operation of the assembly will readily appear from the foregoing description. Assuming the screw to have a right-hand thread, the locking ring is assembled on the head as shown in Figure 1 and the screw rotated clockwise as indicated by arrow A, the spring being caused to resiliently contract as it is drawn into the bore 26. In turning the screw to its seating position, the ring is frictionally rotated against the internal surface of the bore 26. It is to be noted, however, that rotation in a clockwise direction, and the frictional engagement of the ring 32 tend to reduce the diameter of the ring, or "wind" the ring up, which in turn reduces the friction, thereby causing the ring to act only as a slight drag against drawing the screw into its ultimate seated position. On the other hand, rotation of the screw in the opposite direction, as in subsequently loosening the screw, causes the friction of the ring against the bore wall 26 to urge the ring to expand its diameter, increasing the radial pressure of the ring against the bore wall, thereby increasing the torque resistance to turning of the screw. The effect is such as to substantially increase the resistance to turning of the screw in the direction of loosening. The degree of friction desired to resist loosening can be varied by varying the resiliency of the ring and by varying the amount of contraction imposed upon the ring upon drawing the same into the bore. The resiliency and contraction factors may be balanced so as to provide a resistance to counter-clockwise rotation, which can be overcome by a wrench applied to the screw, to loosen the same, but which resistance at the same time will effectually prevent rotation without the application of such a positive and powerful torque.

Since it is a known fact that the loosening torque tending to loosen a screw is relatively small, very little friction is required between the wall and the spring to overcome such loosening torque. The greater resistance to rotation in one direction provides an additional factor of safety, although the resistance provided by the ring in either direction is usually or can be made to be sufficient to overcome the loosening torque. Because of this added safety factor, it is preferable to employ the ring in a reverse position when the screw is left-handed.

The invention may be applied to the head end of a set screw 46 as shown in Figure 5, if desired. In such an application the head receiving bore 48 should be beveled as at 50 to receive the split ring 32. It will be observed that the locking device will be effective at any desired set-screw setting, and does not depend upon the seating of the screw to any one position.

The ring could be applied to the cylindrical portion 52 of the shank of the screw 14, by designing the ring in the same manner as the ring 32 of the set-screw 46. In such a case the annular groove need not be deep enough to reduce the metal cross section to that of the thread root cross section, so that the shank is not weakened materially.

In practice the diameter of the bottom of the groove 34 should be equal to the diameter of the bore 26, less twice the cross-sectional diameter of the ring plus the clearance between the shank 52 and aperture 53, this latter clearance governing any eccentricity of the head 18 in the bore 26. With the groove located approximately in the position shown in Figures 2 and 3, the head is not weakened in any respect by the groove in so far as its load-carrying ability is concerned.

It will also be appreciated that the corner 54 of the free end of the ring will be preferably rounded so as not to dig into the wall of the bore 26, thereby permitting the screw to be removed and replaced without damage such as cutting or scoring of the parts. On the other hand, if it be desired, the corner 54 may be sharpened so as to dig slightly into the wall upon counter-clockwise turning; and thus act as an absolute lock; although such is not required, because the friction of the ring is sufficient in all ordinary cases to prevent rotation.

Though but one embodiment of the invention with an adaptation thereof has been illustrated and described, it is to be understood that the invention is not limited thereto but may be embodied in various mechanical forms and arrangements. As various changes in construction and form may be made without departing from the spirit of the invention, as will be apparent to those skilled in the art, reference will be had to the appended claim for a definition of the limits of the invention.

What is claimed is:

In combination, a pair of structural members and a socket head screw securing said members together, said screw comprising a head having a load bearing annular shoulder and threaded shank extending therefrom, said members having axially aligned apertures, one being threaded to receive the shank of said screw, and the other having a cylindrical counterbore and load bearing annular seat to receive the load bearing shoulder of the head of said screw, the head of said screw having an annular groove therein, a split resilient ring lying in said groove resiliently contracted by the counterbore, and in frictional engagement therewith, means for keying one end of said ring to said head to prevent relative rotation therebetween, the end so keyed being such as to tend to contract the ring upon rotation of the screw in a tightening direction and the other end of said ring being rounded, said head and counterbore being of a diameter to provide normal clearance and means for contracting said ring to the counterbore diameter upon entrance of said ring into said bore in response to threading said screw into said threaded aperture.

HAROLD C. HALLERSTROM.

REFERENCES CITED

The following references are of record in the file of this patent:

UNITED STATES PATENTS

| Number | Name | Date |
|---|---|---|
| 1,395,946 | Clemons | Nov. 1, 1921 |
| 1,470,386 | Miller | Oct. 9, 1923 |
| 1,809,620 | Cole | June 9, 1931 |
| 2,136,523 | Rosenberg | Nov. 15, 1938 |

FOREIGN PATENTS

| Number | Country | Date |
|---|---|---|
| 409,155 | Germany | Jan. 31, 1925 |